United States Patent
Yoshiaki et al.

(10) Patent No.: US 6,602,164 B2
(45) Date of Patent: Aug. 5, 2003

(54) TORQUE CONTROL SYSTEM AND TORQUE CONTROL METHOD FOR HYBRID VEHICLE

(75) Inventors: Sano Yoshiaki, Aichi (JP); Kevin Walters, Okazaki (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/985,893

(22) Filed: Nov. 6, 2001

(65) Prior Publication Data

US 2002/0055411 A1 May 9, 2002

(30) Foreign Application Priority Data

Nov. 6, 2000 (JP) ........................ 2000-337615

(51) Int. Cl.[7] ................. B60K 41/04; B60K 41/02; B60K 1/00; B60K 6/00; H02P 17/00
(52) U.S. Cl. ................ 477/107; 477/5; 477/6; 477/8; 477/20; 180/65.2
(58) Field of Search ............... 477/107, 109, 477/5, 6, 8, 13, 17, 20; 180/65.2, 65.3, 65.6, 65.7

(56) References Cited

U.S. PATENT DOCUMENTS

| | | | | |
|---|---|---|---|---|
| 6,190,283 B1 | * | 2/2001 | Uchida | 477/5 |
| 6,233,508 B1 | * | 5/2001 | Deguchi et al. | 701/22 |
| 6,258,008 B1 | * | 7/2001 | Tabata et al. | 477/107 |
| 6,278,915 B1 | * | 8/2001 | Deguchi et al. | 701/22 |
| 6,328,670 B1 | * | 12/2001 | Minowa et al. | 477/5 |

FOREIGN PATENT DOCUMENTS

JP    11-69509 A    3/1999

OTHER PUBLICATIONS

Translation of Japanese patent JP11069509.*

* cited by examiner

Primary Examiner—Sherry Estremsky
Assistant Examiner—Tisha D. Lewis
(74) Attorney, Agent, or Firm—Birch, Stewart, Kolasch & Birch, LLP

(57) ABSTRACT

When the engine torque starts decreasing prior to disengagement of a clutch, the motor torque realMT is controlled to compensate for the deficiency in the engine torque tpsET due to the decrease in the engine torque. Further, the motor torque realMT is controlled to compensate for a deficiency in the engine torque tpsET after engagement of the clutch until increasing of the throttle opening is completed. By controlling the motor torque as such, the reduction in the engine torque tpsET can be compensated for by the motor torque realMT not only when the clutch is being disengaged but also prior to the disengagement of the clutch and after engagement thereof, thus preventing fluctuation in acceleration of the vehicle due to the increase and decrease in torque.

10 Claims, 7 Drawing Sheets

TORQUE CONTROL SYSTEM AND TORQUE CONTROL METHOD FOR HYBRID VEHICLE

This nonprovisional application claims priority under 35 U.S.C. §119(a) on Patent Application No. 2000-337615, filed in Japan on Nov. 6, 2000, which is herein incorporated by reference.

BACKGROUND OF THE INVENTION

1. Field of the Invention

This invention relates to a torque control system for a hybrid vehicle, which enables a motor to compensate a drop in engine torque when shifting gears of a transmission.

2. Description of Related Art

Japanese Patent Laid-Open Publication No. 11-69509 discloses an example of a conventional torque control system for a hybrid vehicle.

The structure of this hybrid vehicle is similar to that of an ordinary mechanical transmission, which is manually operated, except that there is additionally provided an actuator for use in shifting gears, controlling a clutch, and controlling a throttle of an engine. If it is determined that it is necessary to shift gears according to a preset shift map, a sequence of operations such as closing of a throttle valve, shifting gears, operation of a clutch, and opening of the throttle is automatically carried out.

In such an automatic transmission, drive torque outputted from an engine is temporarily blocked when gears are shifted, and this may give a driver bad impressions such as a sense of deceleration and a sense of free running due to a change in the acceleration.

Accordingly, the hybrid vehicle disclosed in the above publication increases drive torque of a motor to compensate a drop in engine torque when the clutch is determined as being disengaged according to the stroke amount of the clutch.

In the torque control system for the hybrid vehicle as mentioned above, however, the control of the motor torque is started when the clutch is disengaged, and the control of the motor torque is stopped when the clutch is engaged. This results in excessive or insufficient motor torque when the clutch is disengaged or engaged, and it is therefore impossible to prevent a driver from feeling a sense of incongruity.

Supposing that the clutch is disengaged, if the throttle valve is closed prior to the disengagement of the clutch as shown in FIG. 8, a driver feels a sense of deceleration due to the decrease in engine torque ET until the disengagement of the clutch, and feels a sense of free running until an actual motor torque MT is increased to reach a target motor torque tgtMT after the disengagement of the clutch. To address this problem, it may be considered that the throttle valve is closed at the same time as the disengagement of the clutch as shown in FIG. 9, but in this case, the increase in the motor torque is unavoidably delayed. Thus, the momentary deficiency in torque fluctuates the acceleration of the vehicle and causes a driver to feel a sense of incongruity.

SUMMARY OF THE INVENTION

It is therefore an object of the present invention to provide a torque control system for a hybrid vehicle, which enables a motor to surely compensate for a drop in engine torque when gears are shifted, thus preventing a driver from feeling a sense of incongruity.

According to the present invention, when engine torque is decreased to shift gears in the transmission, a difference between the actual engine torque and the target torque corresponding to the depression amount of an accelerator pedal is increased to cause the motor torque to increase. This compensates for a deficiency in the actual engine torque with respect to the target engine torque corresponding to the depression amount.

Thereafter, when the transmission of the actual engine torque is terminated due to the disengagement of the clutch, the motor is controlled based on the target engine torque corresponding to the depression amount by a driver, so that the motor torque can compensate all the engine torque corresponding to the depression amount.

Further, when the engine torque increases due to the engagement of the clutch upon completion of shifting, the difference between the actual engine torque and the target engine torque corresponding to the depression amount decreases as the actual engine torque increases, thus causes the motor torque to decrease. This compensates the deficiency in the actual engine torque with respect to the target engine torque corresponding to the depression amount.

Thus, when the engine torque starts decreasing prior to the disengagement of the clutch, the motor torque is controlled to compensate for a deficiency in the engine torque. Likewise, after the engagement of the clutch, the motor torque is controlled to compensate for a deficiency in the engine torque until the increase in the engine torque is completed.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A preferred embodiment of a torque control system for a hybrid vehicle according to the present invention will now be described with reference to the accompanying drawings.

Figure 1:
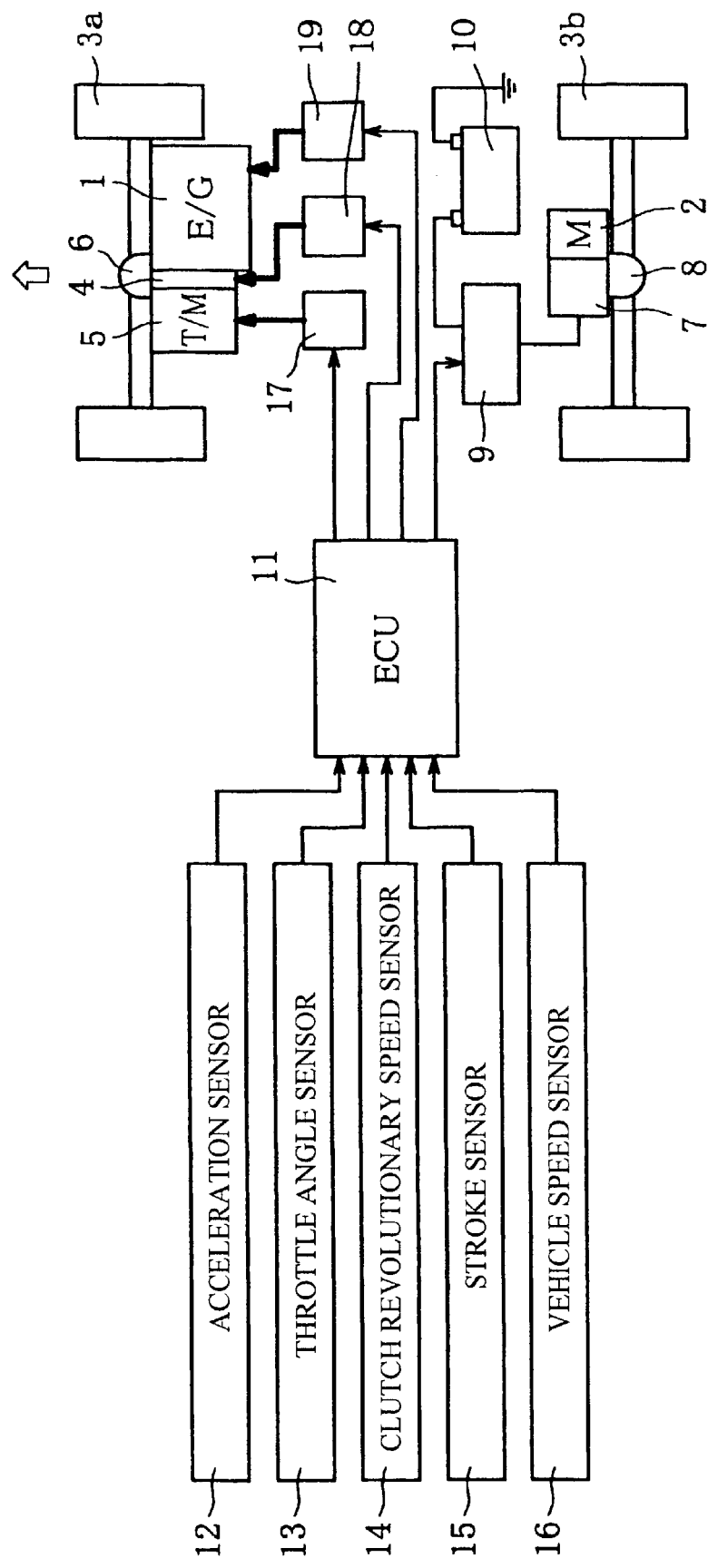
FIG. 1 is a block diagram showing the entire structure of a torque control system for a hybrid vehicle according to an embodiment.

FIG. 1 is a block diagram showing the entire structure of a torque control system for a hybrid vehicle according to the present embodiment. As shown in FIG. 1, the hybrid vehicle according to the present embodiment comprises an engine 1 and a motor 2 that independently drive front wheels 3a and rear wheels 3b, respectively.

In further detail, an automatic transmission 5 is connected to a gasoline engine 1 installed at the front of the vehicle via a clutch 4, and the revolution of the engine 1 is transmitted to the front wheels 3a through the automatic transmission 5 and a differential 6.

The basic structure of the automatic transmission 5 is similar to that of a conventional manually operated mechanical transmission except that the automatic transmission 5 is capable of an automatic gear shifting by automating the operations for shifting, controlling a clutch, and controlling a throttle valve of the engine 1 as described later.

A reduction gear 7 of a planetary gear type is connected to the motor 2 installed at the rear of the vehicle, and the rotation of the motor 2 is transmitted to the rear wheels 3b through the reduction gear 7 and a differential 8.

A drive battery 10 for driving the vehicle is connected to the motor 2 via an inverter 9 that controls the rotation of the motor 2.

On the other hand, a vehicle compartment contains an input/output device not illustrated; a storage device (e.g. ROM or RAM) for storing a control program, a control map, and the like; a central processing unit (CPU); and an ECU (electronic control unit) 11 having a timer counter and the like.

A variety of sensors such as an acceleration sensor 12 for detecting an accelerator pedal depression amount (hereinafter, "accelerator control input") APS by a driver, a throttle valve opening angle sensor 13 for detecting a throttle valve opening angle (hereinafter, "throttle angle") TPS of the engine 1, a clutch revolutionary speed sensor 14 for detecting a revolutionary speed Ne at the output side of the clutch 4, a stroke sensor 15 for detecting a clutch stroke STe, and a vehicle speed sensor 16 for detecting a vehicle speed V, are connected to the input side of the ECU 11.

Furthermore, a shift actuator 17 for actuating a shifting operation of the automatic transmission 5, a clutch actuator 18 for engaging and disengaging the clutch 4, a throttle valve actuator 19 for opening and closing a throttle valve of the engine 1, the above-mentioned inverter 9, and the like are connected to the output side of the ECU 11.

There will be described the operations carried out by the torque control system for the hybrid vehicle constructed in the above-mentioned manner to control the torque of the motor 2 when gears are shifted. Prior to this description, there will be outlined the basic operations for controlling the vehicle, for example, the switching of the drive source between the engine and the motor, the control of the throttle valve of the engine 1, and the control of the shifting operation of the automatic transmission 5.

Basically, the hybrid vehicle according to the present embodiment is started by the motor 2, and is thereafter driven by the engine 1. If the quantity of electricity charged in the drive battery 10 is not greater than a predetermined value, the hybrid vehicle is started by the engine 1. The drive battery 10 is charged by transmitting a driving force of the engine 1 to the motor 2 through a road surface during normal driving or by disengaging the clutch 4 to regenerate the motor 2 during deceleration.

While the vehicle is driven or the like as mentioned above, the throttle valve of the engine 1 is controlled according to a throttle valve control map, not illustrated, and the ECU 11 drives the throttle valve actuator 19 to achieve a target throttle valve opening angle (hereinafter, "target throttle angle") tgtTPS determined from the map according to the accelerator control input APS. The shifting operation is controlled according to a shift control map, not illustrated, and the ECU 11 drives the respective actuators 17~19 for shifting, clutch control, and throttle control in order to achieve a target gear position determined from the map according to the accelerator control input APS and a vehicle speed V.

More specifically, when the target gear position is changed on the map, the throttle angle TPS is set to zero (closed) regardless of the target throttle angle tgtTPS determined from the throttle control map. The clutch 4 is then disengaged to switch the gear position to the target gear position, and the clutch 4 is engaged to return the throttle angle TPS to the target throttle angle tgtTPS determined from the throttle control map. The sequence of operations achieves the target gear position.

According to the present embodiment, the ECU 11, carrying out the shifting operation, functions as shift control means. It should be noted that the hybrid vehicle according to the present embodiment has a manual shifting mode as well as the automatic shifting mode in which the gears are automatically changed according to the map as mentioned above. In the manual shifting mode, the above-stated shifting operation is carried out to achieve a gear position selected by a driver.

Since the engine torque is temporarily blocked when the gears are being shifted, the motor torque is controlled to increase to compensate for a drop in the engine torque.

Figure 2:
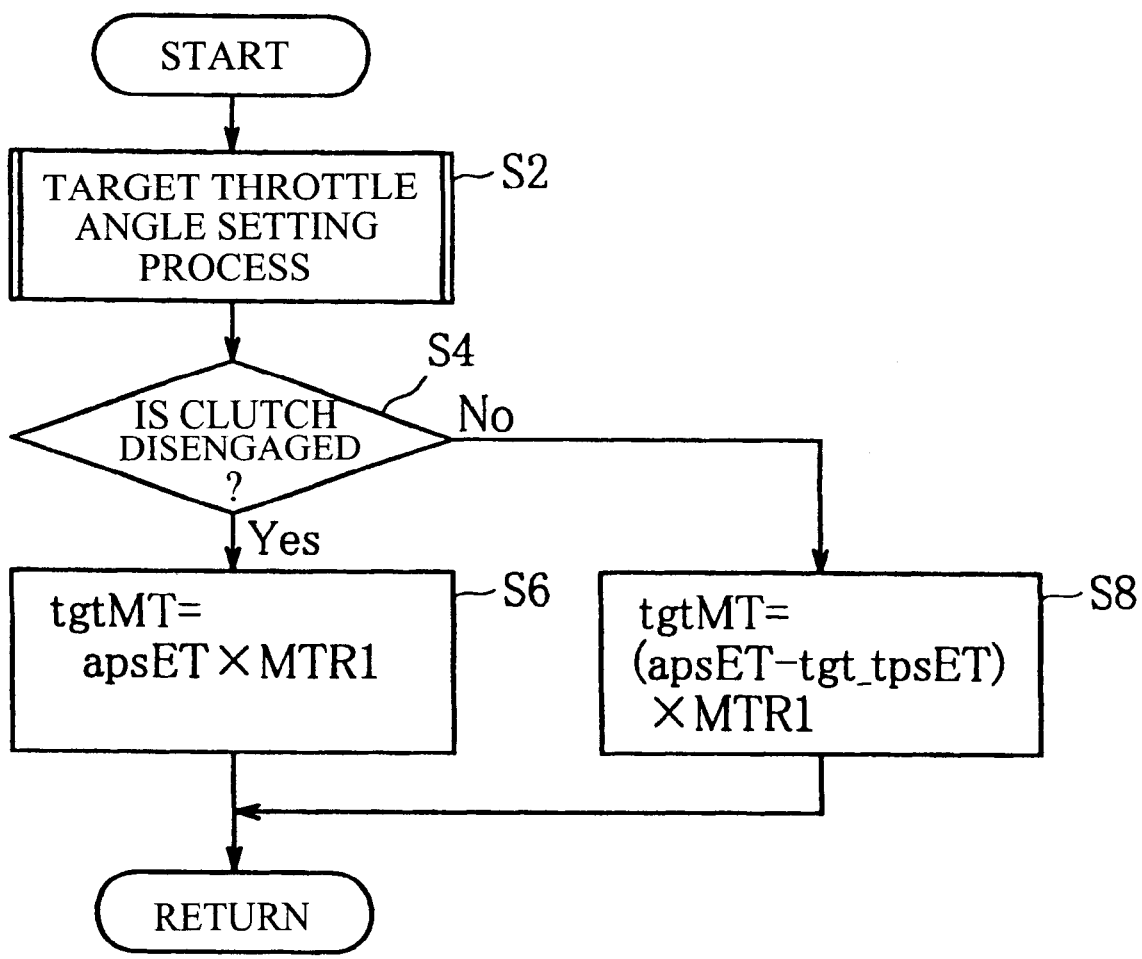
FIG. 2 is a flow chart showing a target motor torque setting routine executed by an ECU.

FIG. 2 is a flow chart showing a target motor torque setting routine. The ECU 11 executes this routine at predetermined control intervals when the gears are shifted as mentioned above.

First, the ECU 11 sets the target throttle angle tgtTPS in step S2. As stated above, the throttle angle TPS is set to zero before the gears are shifted, and is returned to the target throttle angle tgtTPS after the gears are shifted. A process for correcting a rate of change dTPS in the throttle angle TPS is carried out in the step S2.

The correcting process is different between while the throttle angle TPS is decreasing (i.e. when the drive source of the vehicle is switched from the engine to the motor) and while the throttle angle TPS is increasing (i.e. when the drive source of the vehicle is switched from the motor to the engine) as described below in further detail.

Figure 3:
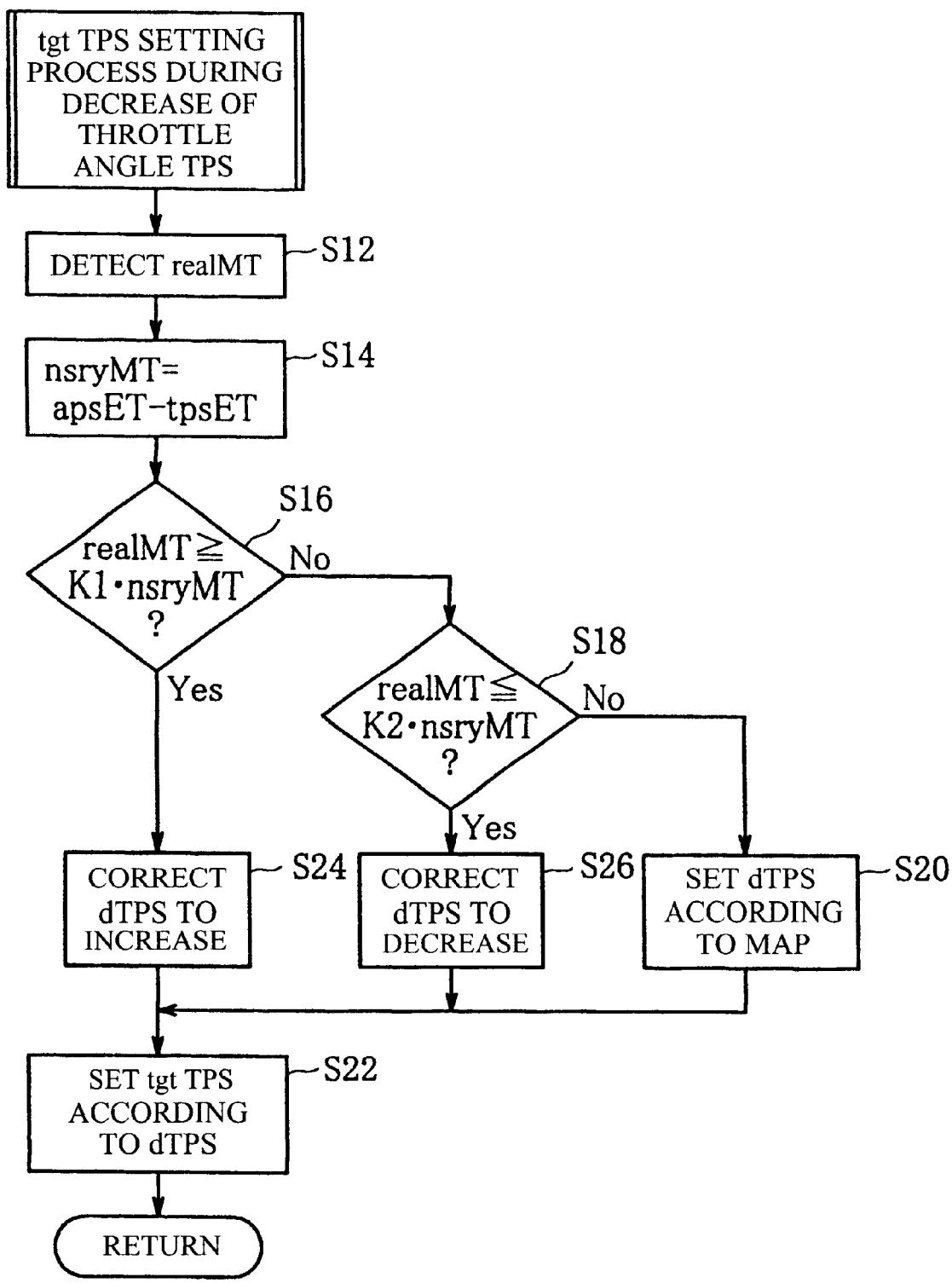
FIG. 3 is a flow chart showing a target throttle valve opening angle setting routine executed by the ECU while the throttle valve opening angle is decreasing.

While the throttle angle TPS is decreasing, the ECU 11 executes an on-decrease target throttle angle setting routine shown in FIG. 3. In step S12, the ECU 11 detects an actual motor torque realMT outputted from the motor according to the present state in which the inverter 9 is controlled.

In the next step S14, the ECU 11 calculates a necessary (required) motor torque nsryMT according to the following equation (1):

$$nsryMT = apsET - tpsET \tag{1}$$

where apsET represents an engine torque corresponding to the depression amount of the accelerator pedal, and tpsET represents an engine torque corresponding to the throttle angle.

These engine torques apsET and tpsET are found from the clutch revolutionary speed Ne and the accelerator control input APS, or the clutch revolutionary speed Ne and the throttle angle TPS according to a torque map based on the characteristics of the engine 1.

More specifically, according to the above equation (1), a deficiency in the engine torque corresponding to acceleration apsET representing the actual engine torque with respect to the engine torque corresponding to the engine torque apsET representing the engine torque required by a driver is calculated as the necessary motor torque nsryMT.

In the next step S16, it is determined whether the actual motor torque realMT is not less than a value calculated by multiplying the necessary motor torque nsry MT by a predetermined value K1 (K1>1.0). If NO, it is determined in step S18 whether the actual motor torque realMT is not greater than a value calculated by multiplying the necessary motor torque nsryMT by a predetermined value K2 (K2<1.0). If NO, the program proceeds to step S20.

Figure 5:
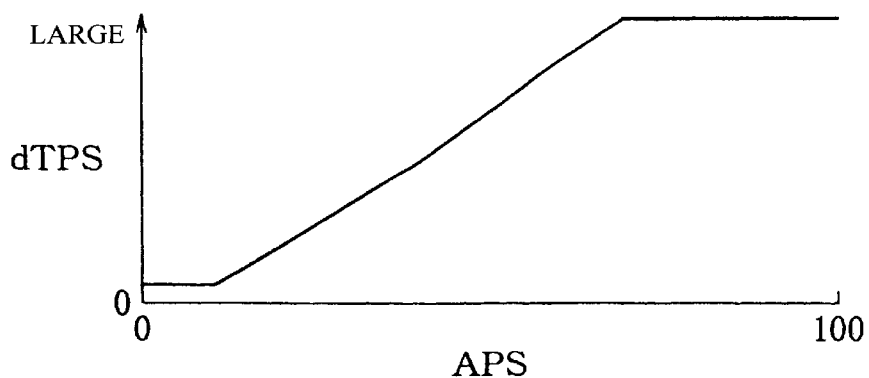
FIG. 5 is a view for explaining a map for use in setting a throttle valve opening angle change dTPS.

More specifically, the actual motor torque realMT equal to the necessary motor torque nsryMT can be obtained in this case. In step S20, the rate of throttle angle change dTPS is determined from the accelerator control input APS based on a map shown in FIG. 5, and in step S22, a target throttle angle tgtTPS for the next controlling operation is determined according to the throttle angle change dTPS. Thus, in this case, the throttle angle TPS is decreased according to the rate of throttle angle change dTPS determined based on the map.

It should be noted that the reason why the rate of throttle angle change dTPS is determined as being great when the accelerator control input APS is large is that the larger accelerator control input APS requires a longer period of time for increasing or decreasing the throttle angle TPS.

Moreover, if determination in the step S16 is YES, i.e. if the actual motor torque realMT is in excess of the necessary motor torque nsryMT, the program proceeds to step S24 wherein the rate of throttle angle change dTPS is corrected to increase. The program then proceeds to step S22. Thus, the throttle angle TPS is decreased more rapidly.

If determination in step S18 is YES, i.e. if the actual motor torque realMT is smaller than the necessary motor torque nsryMT, the program proceeds to step S26 wherein the rate of throttle angle change dTPS is corrected to decrease. The program then proceeds to step S22. Thus, the throttle angle TPS is decreased more slowly.

Figure 4:
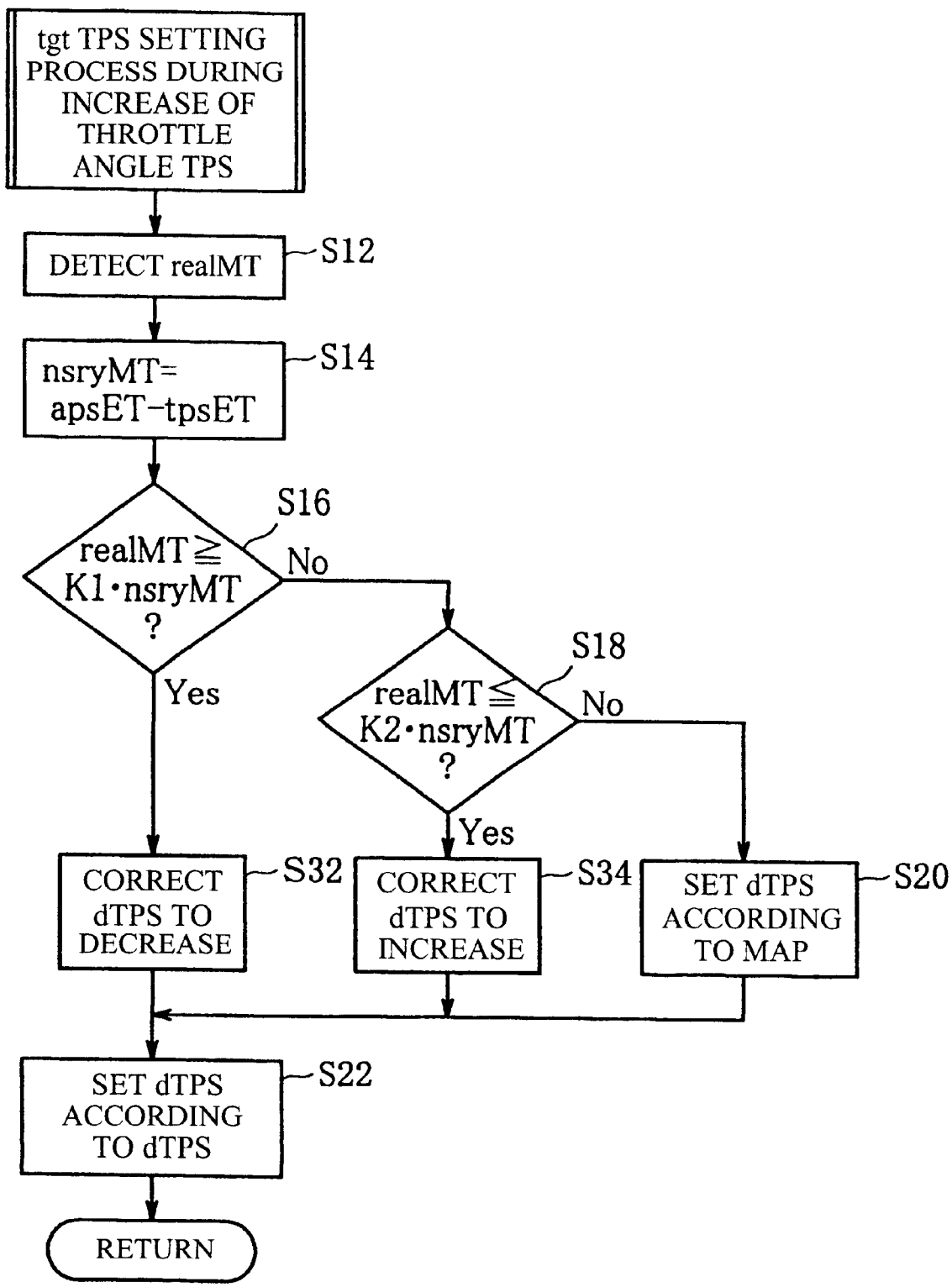
FIG. 4 is a flow chart showing a target throttle valve opening angle setting routine executed by the ECU while the throttle valve opening angle is increasing.

On the other hand, when the throttle angle TPS is increasing in step S2, the ECU 11 executes an on-increase target throttle angle setting routing as shown in FIG. 4.

This routine is similar to the above-mentioned on-decrease target throttle angle setting routine except that the throttle angle TPS is changed in a reverse direction (in a direction to increase).

More specifically, if determination in step S16 is YES, i.e. if the actual motor torque MT is excessive, the rate of throttle angle change dTPS is corrected to decrease in step S32 to slow the increase in the throttle angle TPS. If determination in step S18 is YES, i.e. if the actual motor torque realMT is insufficient, the rate of throttle angle change dTPS is corrected to increase in step S34 to rapidly increase the throttle angle TPS.

After setting the target throttle angle tgtTPS in the above-mentioned manner, the program returns to the routine shown in FIG. 2, wherein the ECU 11 determines whether the clutch 4 is disengaged, i.e. whether the clutch 4 is not capable of transmitting power according to the clutch stroke Ste detected by the stroke sensor 15 in step S4. If YES, the program proceeds to step S6, wherein the target motor torque tgtMT is calculated according to the following equations (2) and (3) to complete the routine:

$$MTR1 = tgt\_i \times def\_i / mot\_i \quad (2)$$

$$tgtMT = apsEt \times MTR1 \quad (3)$$

where MTR1 represents a coefficient for converting the torque of the engine 1 to the torque of the motor 2, tgt i represents a gear ratio for a target gear position set in the shift controlling operation, def i represents a gear ratio of the differential 6, and mot i represents a total gear ratio of the reduction gear 7 and the differential 8 by the side of the motor 2.

More specifically, since torque cannot be transmitted from the engine to the transmission 1 when the clutch is disengaged, the target motor torque tgtMT, satisfying the engine torque equivalent to acceleration apsET, is calculated so that the motor torque can compensate for all the engine torque equivalent to acceleration apsET required by a driver.

If determination in step S4 is NO, the program proceeds to step S8 wherein the target motor torque tgtMT is calculated according to the following equations (2) and (4) to complete the routine;

$$tgtMT = (apsET - tgt\_tpsET) \times MTR1 \quad (4)$$

where tgt_tpsET represents an engine torque corresponding to target throttle angle. The engine torque tgt_tpsET is calculated from the clutch revolutionary speed Ne and the target throttle angle tgtTPS according to the torque map as is the case with the engine torque corresponding to acceleration apsET and the engine torque corresponding to throttle angle tpsET.

Specifically, since the torque is transmitted from the engine 1 when the clutch is engaged, the motor torque can compensate for the deficiency in the engine torque. Accordingly, the engine torque corresponding to target throttle angle tgt_tpsET is subtracted from the engine torque corresponding to acceleration apsET to calculate the target motor torque tgtMT.

In this case, the reason why the engine torque corresponding to target throttle angle tgt_tpsET is used instead of the engine torque tpsET corresponding to the throttle angle tpsET is to prevent a delay in control until the actual throttle angle TPS reaches the target throttle angle tgtTPS.

According to the present embodiment, the ECU 11 functions as an engine torque-equivalent-to-acceleration estimating means, an actual engine torque estimating means, and a motor torque control means when executing the operations in steps S4 to S8.

According to the target motor torque tgtMT set in the above-mentioned manner, the inverter 9 controls the motor torque when the gears are shifted.

Figure 6:
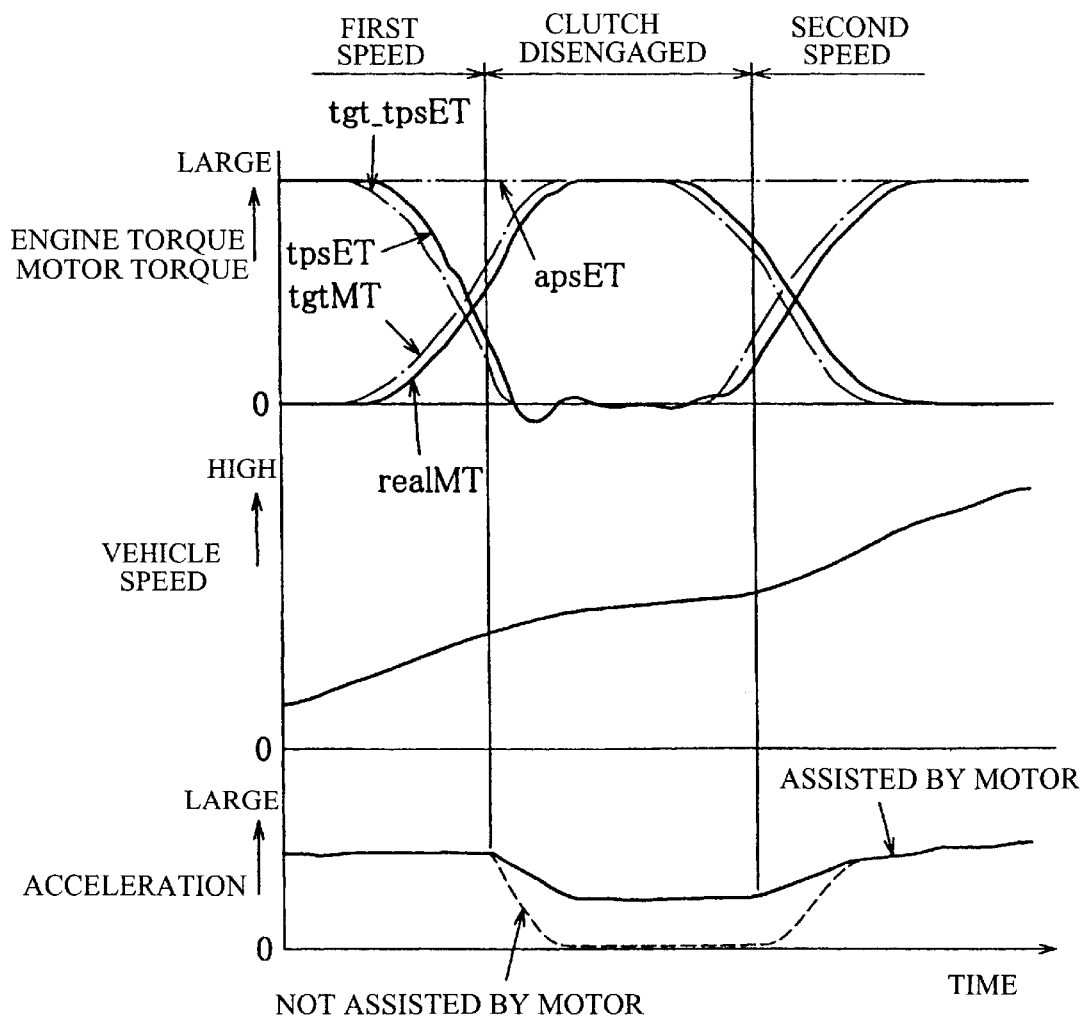
FIG. 6 is a time chart showing the state in which the motor torque is controlled when gears are shifted.

FIG. 6 is a time chart showing the state in which the motor torque is controlled when the gears are shifted. The torque control will now be described with reference to this figure.

For example, the target throttle angle tgtTPS is corrected to decrease if the target gear position is shifted from the first gear position to the second gear position according to the shift control map due to the increase in the vehicle speed V while a driver is accelerating the vehicle with a constant accelerator control input APS being maintained. The throttle angle TPS is controlled according to the decreasing target throttle angle tgtTPS to decrease the actual engine torque (engine torque corresponding to throttle angle tpsET).

On this occasion, the clutch 4 is still held in the engaged state, and thus, the target motor torque tgtMT is calculated according to the above equation (4) in step S8.

In this case, the engine torque corresponding to throttle angle tpsET based on the accelerator control input APS is substantially constant, the engine torque corresponding to target throttle angle tgt_tpsET based on the target throttle angle tgtTPS is decreased. Thus, the target motor torque tgtMT calculated in step S8 is gradually increased from zero, and accordingly, the actual motor torque (actual motor torque realMT) is also increased.

The target motor torque tgtMT is always determined to be equal to a decrease in the engine torque corresponding to target throttle angle tgt_tpsET, i.e. a deficiency in torque transmitted from the engine 1, and thus, the motor torque compensates for a drop in the engine torque caused by the decrease in the throttle angle TPS.

Further, the clutch 4 is disengaged before the target throttle angle tgtTPS reaches zero, and the target motor torque tgtMT is calculated according to the above equation (3) in step S6 instead of the step S8.

The disengagement of the clutch 4 disables the transmission of the torque from the engine 1, but the target motor torque tgtMT corresponding to the engine torque corresponding to throttle angle tpsET continuously compensates for a drop in the engine torque.

In this case, the engine torque corresponding to throttle angle tpsET is reached quickly since the motor torque has already increased to a value in proximity to the engine torque corresponding to throttle angle tpsET just before the disengagement of the clutch 4.

Upon completion of the shift to the next gear position, the target throttle angle tgtTPS is corrected to increase from zero, and accordingly, the actual throttle angle TPS is also increased.

On this occasion, the clutch 4 is still held in the disengaged state, and thus, the target motor torque tgtMT corresponding to the engine torque corresponding to throttle angle tpsET is continuously calculated according to the above equation (3) in step S6.

When the clutch 4 is engaged again, the target motor torque tgtMT is calculated according to the above equation (4) in step S8.

The target motor torque tgtMT gradually decreases with the increase in the engine torque corresponding to target throttle angle tgt_tpsET. When the target throttle angle tgtTPS corresponds to the accelerator control input APS, the target motor torque tgtMT reaches zero. Similarly, when the target throttle angle tgtTPS is increasing, the target motor torque tgtMT is determined according to a deficiency in the torque transmitted from the engine 1.

The above control causes the motor torque to compensate for a drop in the engine torque when the gears are being shifted, and enables the continuous acceleration and prevents the fluctuation in the acceleration of the vehicle while the gears are shifted as shown in FIG. 6.

Figure 8:
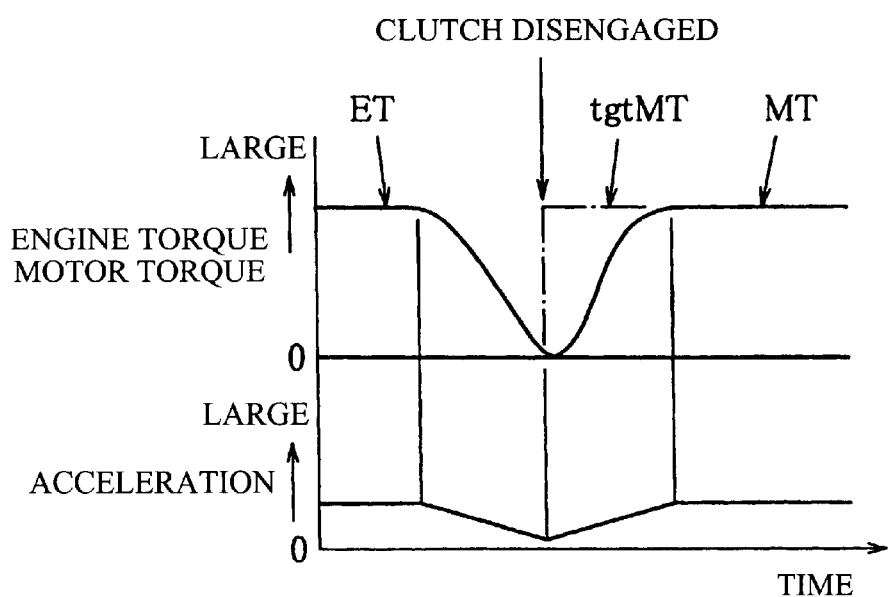
FIG. 8 is a time chart showing the state in which a conventional motor control device provides control such that a throttle valve is closed prior to the disengagement of a clutch.
Figure 9:
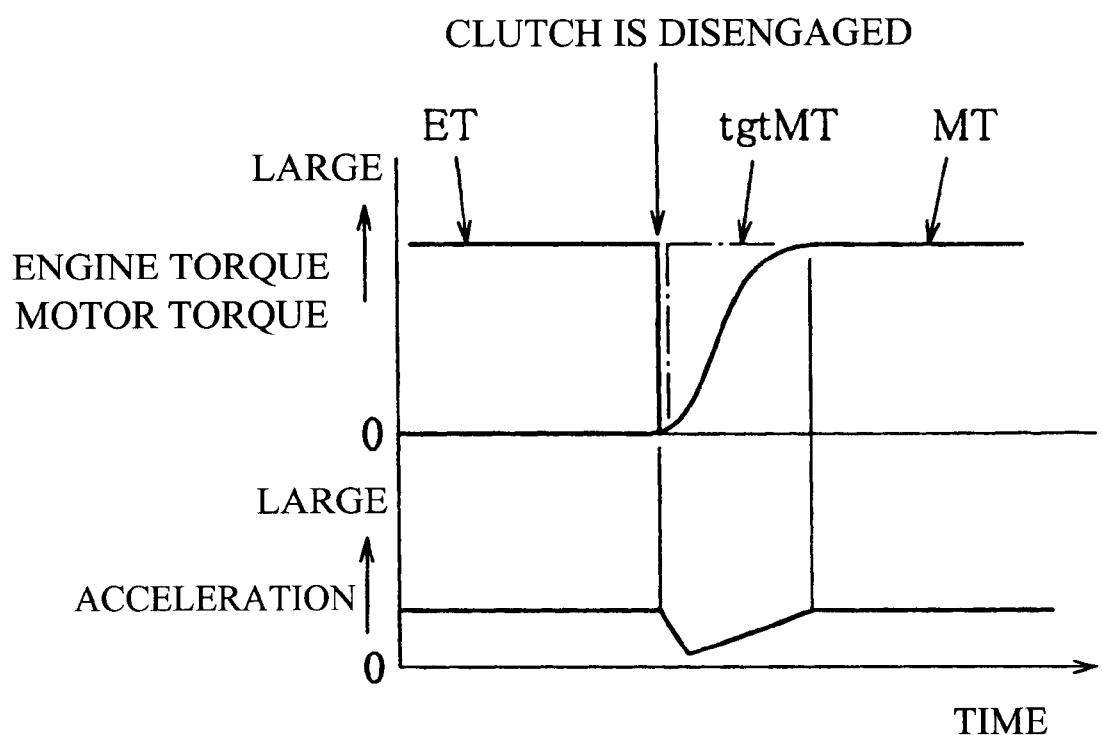
FIG. 9 is a time chart showing the state in which a conventional motor control device provides control such that a clutch is disengaged at the same time as the closing of a throttle valve.

According to the present embodiment, the motor torque is controlled not only when the clutch is in the disengaged state as in the prior art shown in FIGS. 8 and 9. According to the present embodiment, when the throttle angle TPS is caused to start decreasing prior to the disengagement of the clutch, the motor torque is controlled to compensate for a deficiency in the engine torque caused by the decrease in the throttle angle TPS. Likewise, after the engagement of the clutch, the motor torque is controlled to compensate for a deficiency in the engine torque until the increase in the throttle angle TPS is completed.

Therefore, the present embodiment solves the problem of the prior art shown in e.g. FIG. 8 in that a driver feels a sense of deceleration due to the decrease in the engine torque until the disengagement of the clutch.

Moreover, as is clear from FIG. 6, only slowly increasing or decreasing the motor torque during a period of time before the disengagement of the clutch until after the engagement of the clutch compensates for a drop in the engine torque. For example, as is the case with the prior art shown in FIGS. 8 and 9, the motor torque corresponding to the engine torque (the engine torque corresponding to acceleration apsET in the present embodiment) is not required suddenly at the same time as the disengagement of the clutch. Therefore, the motor torque never becomes excessive or insufficient due to a delay in the increase of the engine torque, and prevents a driver from feeling a sense of incongruity due to the fluctuation of the acceleration.

Consequently, the torque control system for the hybrid vehicle according to the present embodiment enables the motor 2 to surely compensate for a drop in the engine torque when the gears are shifted, thus preventing a driver from feeling a sense of incongruity.

Figure 7:
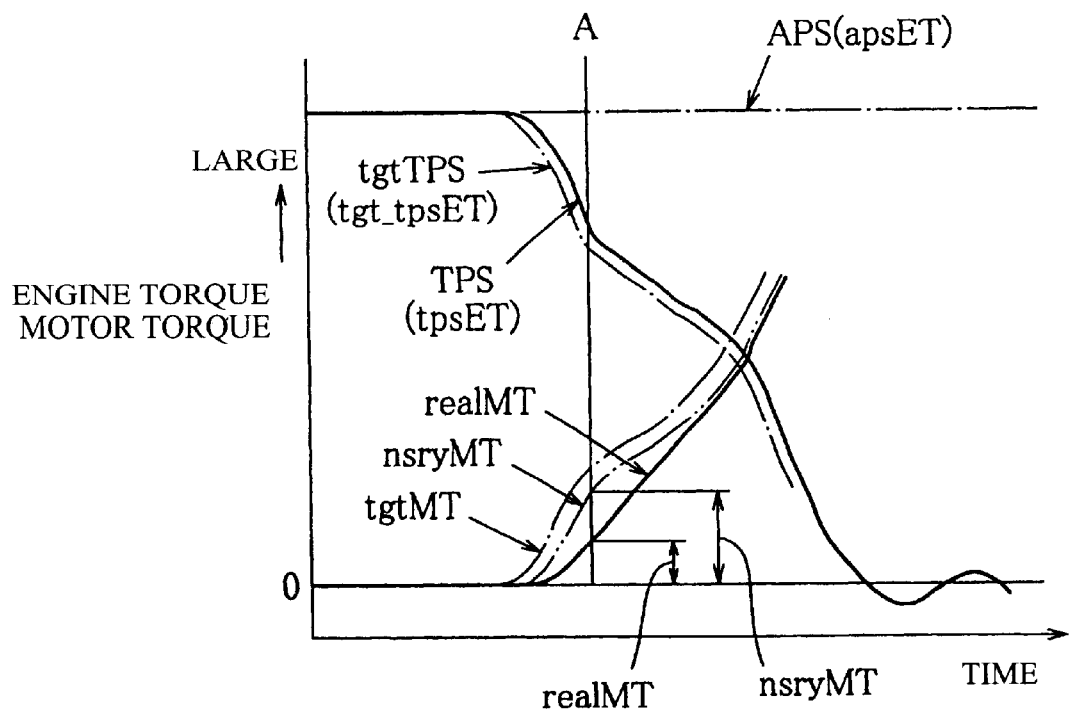
FIG. 7 is a time chart showing the state in which the throttle valve opening angle change dTPS is corrected while the target throttle valve opening angle is decreasing.

FIG. 7 is a time chart showing how the rate of throttle angle change dTPS is corrected while the target throttle angle tgtTPS is decreasing. For example, at point A in the figure, if the actual motor torque realMT does not follow the increase in the target motor torque tgtMT due to a delay in control or the like, the actual motor torque realMT is smaller than the necessary motor torque nsryMT. On this occasion, the program proceeds from step S18 to step S26 in FIG. 3 wherein the rate of throttle angle change dTPS is corrected to decrease. Thus, the throttle angle TPS is decreased more slowly on and after the point A.

Consequently, the actual motor torque realMT starts following the target motor torque tgtMT to properly compensate for a deficiency in the engine torque.

Likewise, if the actual motor torque realMT does not follow the decrease in the target motor torque tgtMT while the target throttle angle tgtTPS is increasing, the throttle angle change dTPS is corrected to decrease in step S32 in FIG. 4 so that the throttle angle TPS can increase more slowly. This causes the actual motor torque realMT to follow the target motor torque tgtMT.

According to the present embodiment, the ECU 11 functions as an engine torque control means when executing the operations in steps S26 and S32.

Therefore, the torque control device for the hybrid vehicle according to the present embodiment, even if there is a delay in control of the motor 2, a deficiency in the torque transmitted in the engine 1 is properly compensated for to prevent the fluctuation in the acceleration of the vehicle to thereby surely prevent a driver from feeling the sense of incongruity.

It should be understood, however, that there is no intention to limit the invention to the embodiment disclosed.

For example, in the hybrid vehicle according to the above embodiment, the engine 1 drives the front wheels 3a and the motor 2 drives the rear wheels 3b independently from each other, but it should be understood that there is no intention to limit the invention thereto. For example, in the hybrid vehicle, the engine 1 and the motor 2 connected to the transmission 5 of the engine 1 may drive the rear wheels 3b. It is needless to say that the engine 1 and the motor 2 may drive the front wheels 3a instead of the rear wheels 3b.

Moreover, in the above embodiment, the clutch 4 is disengaged while the throttle angle TPS is decreasing and the clutch 4 is engaged while the throttle angle TPS is increasing, but it should be understood that there is no intention to limit the invention thereto. For example, the clutch 4 may be disengaged after the decrease in the throttle angle TPS is completed, and the clutch 4 may be engaged before the throttle angle TPS starts increasing.

Further, in the above embodiment, a variety of parameters are used to calculate the engine torque and the motor torque, but it should be understood that there is no intention to limit the invention thereto. Any other means may be used insofar as the same effects can be achieved.

For example, in the above embodiment, the engine torque corresponding to target throttle angle tgt_tpsET is used to prevent a delay in control of the throttle when the target motor torque tgtMT is calculated before the disengagement of the clutch and after the engagement of the clutch in step S8, but the engine torque corresponding to throttle angle tgsET may be used instead.

Further, the engine torque is estimated based on the clutch revolutionary speed Ne according to the engine torque map, but the engine torque may be estimated based on the engine speed.

Further, according to the present embodiment, the gasoline engine is used as the engine 1, and the engine torque is decreased by decreasing the target throttle angle tgtTPS when the gears are shifted, and the target motor torque tgtMT is calculated by using the engine torque corresponding to the target throttle angle tgt_tpsET determined from the target throttle angle tgtTPS. It should be understood, however, that there is no intention to limit the invention thereto.

For example, if a diesel engine is used as the engine 1, the engine torque is decreased by forcedly changing a rack position of a fuel injection pump when the gears are shifted, and the actual engine torque is estimated according to the rack position or the like so that the target motor torque tgtMT can be determined according to the engine torque.

Further, the hybrid vehicle according to the present embodiment is provided with the automatic transmission capable of executing the automatic shifting mode for shifting gears according to the map and the manual shifting mode for achieving a gear position selected by a driver, but it should be understood that there is no intention to limit the invention thereto. For example, the hybrid vehicle may be provided with an automatic transmission capable of executing only one mode, for example, the manual shifting mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A torque control system for a hybrid vehicle, comprising:

an engine and an electric motor serving as drive power sources of the vehicle;

a clutch connected to an output side of said engine;

a transmission connected to an output side of said clutch;

engine torque control means for controlling a torque of said engine;

shift control means for performing a gear shift operation by selectively engaging and disengaging said clutch and selectively shifting gears of said transmission while the engine torque is being temporarily varied by said engine torque control means;

accelerator control input detecting means for detecting a depression amount of an accelerator pedal by a driver;

depression amount corresponding engine torque estimating means for estimating a depression amount corresponding engine torque that corresponds to the detected depression amount;

actual engine torque estimating means for estimating an actual engine torque; and motor torque control means for controlling torque of said motor, said motor torque control means including,
first control means for controlling a torque of said motor based on the estimated depression amount corresponding engine torque while said clutch is in a totally disengaged state, and
second torque control means for increasing the torque of said motor based on a difference between the estimated depression amount corresponding engine torque and the estimated actual engine torque as the estimated actual engine torque is decreased prior to disengagement of said clutch for performing the gear shift operation, and
third torque control means for decreasing the torque of said motor based on the difference as the estimated actual engine torque is increased prior to engagement of said clutch after performing the gear shift operation.

2. A torque control system for a hybrid system according to claim 1, wherein said engine torque control means includes,
engine torque correcting means for decreasing a rate of change in the estimated actual engine torque when the torque of said motor controlled by one of said first torque control means and said second torque control means does not follow the change in the engine torque during the gear shift operation.

3. A torque control system for a hybrid vehicle according to claim 1, wherein said engine torque control means further includes,
target engine torque setting means for setting a target engine torque for use during the gear shift operation, and
engine torque change rate changing means for changing a changing rate of said set target engine torque based on increase and decrease in the engine torque.

4. A torque control system for a hybrid vehicle, comprising:

an engine and an electric motor serving as drive power sources of the vehicle;

a clutch connected to an output side of said engine;

a transmission connected to an output side of said clutch;

engine torque control means for controlling a torque of said engine;

shift control means for performing a gear shift operation by selectively engaging and, disengaging said clutch and selectively shifting gears of said transmission while the engine torque is being temporarily varied by said engine torque control means;

accelerator control input detecting means for detecting a depression amount of an accelerator pedal by a driver;

depression amount corresponding engine torque estimating means for estimating a depression amount corresponding engine torque that corresponds to the detected depression amount;

actual engine torque estimating means for estimating an actual engine torque;

motor torque control means for controlling torque of said motor, said motor torque control means including,
first control means for controlling a torque of said motor based on the estimated depression amount corresponding engine torque while said clutch is in a totally disengaged state, and second torque control means for controlling the torque of said motor based on a difference between the estimated depression amount corresponding engine torque and the estimated actual engine torque when said clutch is in at least one of a state prior to disengagement and after engagement;

actual motor torque detecting means for detecting an actual motor torque; and necessary motor torque detecting means for detecting a required motor torque based on the detected actual motor torque and the estimated depression amount corresponding engine torque, wherein said engine torque change rate changing means includes, first correcting means for increasing the rate of change in the engine torque when the detected actual motor torque is greater than the detected required motor torque while the engine torque is decreasing, and second correcting means for decreasing the rate of change in the engine torque when the detected actual motor torque is smaller than the detected required motor torque while the engine torque is decreasing.

5. A torque control system for a hybrid vehicle, comprising:

an engine and an electric motor serving as drive power sources of the vehicle;

a clutch connected to an output side of said engine;

a transmission connected to an output side of said clutch;

engine torque control means for controlling a torque of said engine;

shift control means for performing a gear shift operation by selectively engaging and disengaging said clutch and selectively shifting gears of said transmission while the engine torque is being temporarily varied by said engine torque control means;

accelerator control input detecting means for detecting a depression amount of an accelerator pedal by a driver;

depression amount corresponding engine torque estimating means for estimating a depression amount corresponding engine torque that corresponds to the detected depression amount;

actual engine torque estimating means for estimating an actual engine torque;

motor torque control means for controlling torque of said motor, said motor torque control means including, first control means for controlling a torque of said motor based on the estimated depression amount corresponding engine torque while said clutch is in a totally disengaged state, and second torque control means for controlling the torque of said motor based on a difference between the estimated depression amount corresponding engine torque and the estimated actual engine torque when said clutch is in at least one of a state prior to disengagement and after engagement;

actual motor torque detecting means for detecting an actual motor torque; and necessary motor torque detecting means for detecting a required motor torque based on the detected actual motor torque and the estimated depression amount corresponding engine torque, wherein said engine torque change rate changing means includes, first correcting means for decreasing the rate of change in the engine torque when the detected actual motor torque is larger than the detected required motor torque while the engine torque is increasing, and second correcting means for increasing the rate of change in the engine torque when the detected actual motor torque is smaller than the detected required motor torque while the engine torque is increasing.

6. A torque control method for a hybrid vehicle, comprising:

providing an engine and an electric motor serving as drive power sources of the vehicle;

providing a clutch connected to an output side of said engine;

providing a transmission connected to an output side of said clutch;

detecting a depression amount of an accelerator pedal by a driver;

estimating a depression amount corresponding engine torque that corresponds to the detected depression amount;

estimating an actual engine torque;

initiating a gear shift operation by selectively engaging and disengaging said clutch and selectively shifting gears of said transmission while varying the engine torque;

controlling a torque of said motor based on the estimated depression amount corresponding engine torque while said clutch is in a totally disengaged state;

increasing the torque of said motor based on a difference between the estimated depression amount corresponding engine torque and the estimated actual engine torque as the estimated actual engine torque is decreased prior to disengagement of said clutch for performing the gear shift operation; and decreasing the torque of said motor based on the difference as the estimated actual engine torque is increased prior to engagement of said clutch after performing the gear shift operation.

7. The torque control method according to claim 6, further comprising:

correcting a rate of change in the engine torque to decrease if one of the motor torque in one of the step of controlling a torque of said motor based on the estimated depression amount corresponding engine torque and the step of controlling the torque of said motor based on the difference does not follow changes in the engine torque during the gear shift operation.

8. The torque control method according to claim 6, further comprising:

setting a target engine torque when shifting gears; and changing the rate of change in the engine torque to the set target engine torque based on increase and decrease in the engine torque.

9. A torque control method for a hybrid vehicle, comprising:

providing an engine and an electric motor serving as drive power sources of the vehicle;

providing a clutch connected to an output side of said engine;

providing a transmission connected to an output side of said clutch;

detecting a depression amount of an accelerator pedal by a driver;

estimating a depression amount corresponding engine torque that corresponds to the detected depression amount;

estimating an actual engine torque;

initiating a gear shift operation by selectively engaging and disengaging said clutch and selectively shifting gears of said transmission while varying the engine torque;

controlling a torque of said motor based on the estimated depression amount corresponding engine torque while said clutch is in a totally disengaged state;

controlling the torque of said motor based on a difference between the estimated depression amount corresponding engine torque and the estimated actual engine torque when said clutch is in at least one of a state prior to disengagement and after engagement;

detecting an actual motor torque;

detecting a required motor torque based on the detected actual motor torque and the estimated depression amount corresponding engine torque;

increasing a rate of change in the engine torque when the detected actual motor torque is greater than the detected required motor torque while the engine torque is decreasing; and decreasing the rate of change in the engine torque when the detected actual motor torque is smaller than the detected required motor torque while the engine torque is decreasing.

10. A torque control method for a hybrid vehicle, comprising:

providing an engine and an electric motor serving as drive power sources of the vehicle;

providing a clutch connected to an output side of said engine;

providing a transmission connected to an output side of said clutch;

detecting a depression amount of an accelerator pedal by a driver;

estimating a depression amount corresponding engine torque that corresponds to the detected depression amount;

estimating an actual engine torque;

initiating a gear shift operation by selectively engaging and disengaging said clutch and selectively shifting gears of said transmission while varying the engine torque;

controlling a torque of said motor based on the estimated depression amount corresponding engine torque while said clutch is in a totally disengaged state; and controlling the torque of said motor based on a difference between the estimated depression amount corresponding engine torque and the estimated actual engine torque when said clutch is in at least one of a state prior to disengagement and after engagement;

detecting an actual motor torque;

detecting a required motor torque based on the detected actual motor torque and the estimated depression amount corresponding engine torque;

decreasing a rate of change in the engine torque when the detected actual motor torque is smaller than the detected required motor torque while the engine torque is increasing; and increasing the rate of change in engine torque when the detected actual motor torque is smaller than the detected required motor torque while the engine torque is increasing.

* * * * *